INVENTOR
RICHARD E. BARTON
BY Robert T. Dunn
ATTORNEY

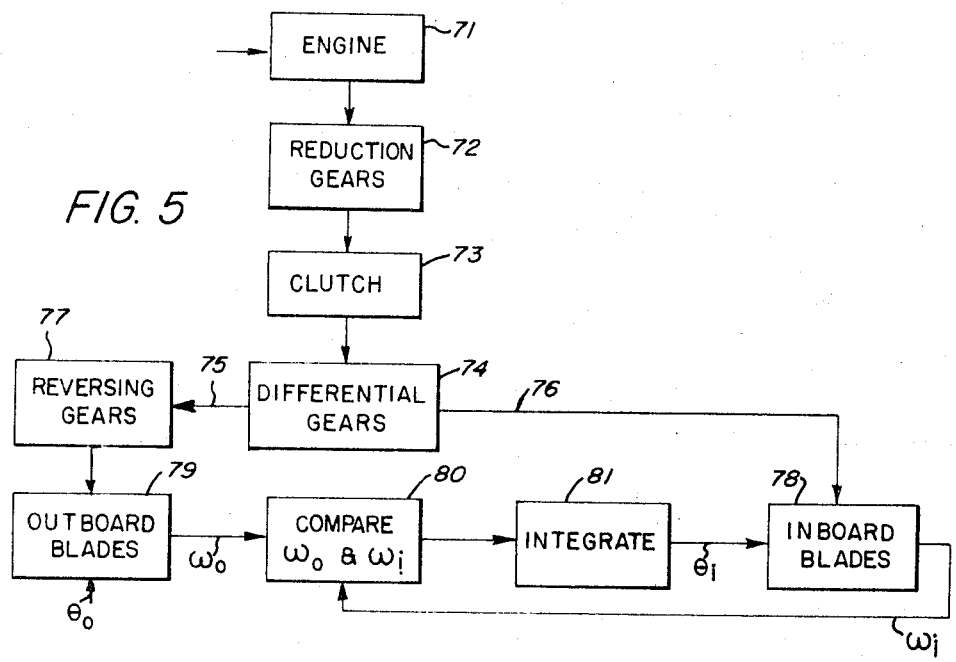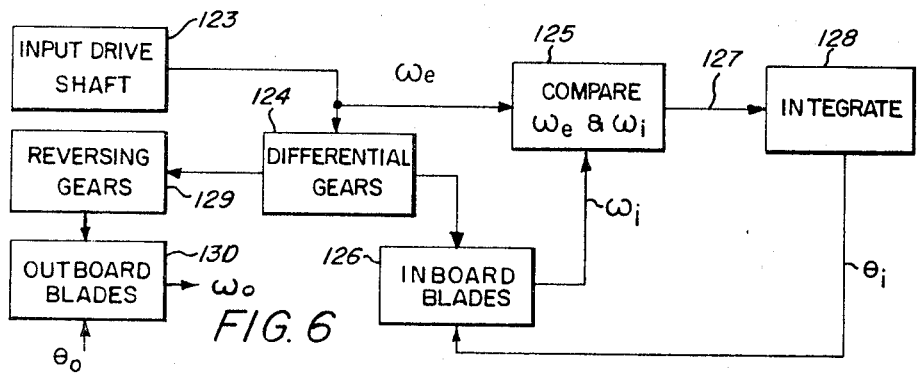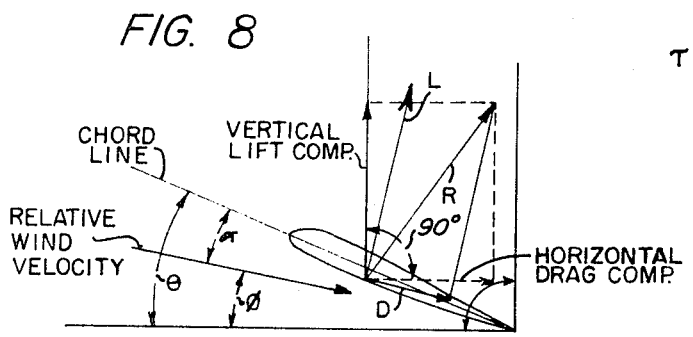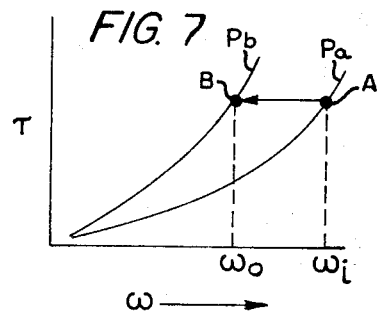

United States Patent Office 3,450,208
Patented June 17, 1969

3,450,208
DUAL DRIVE MECHANISM
Richard E. Barton, 187 Kent St.,
Scituate, Mass. 02066
Filed Apr. 7, 1967, Ser. No. 629,230
Int. Cl. B64c 27/10
U.S. Cl. 170—135.27                              11 Claims

ABSTRACT OF THE DISCLOSURE

The dual drive mechanism includes two output drive shafts which rotate at a fixed steady state speed ratio and a fixed torque ratio during steady state and during periods of transition between steady state conditions. The two output drive shafts are driven by a differential gear mechanism designed so that the ratio of torques delivered by the differential gear mechanism is always constant and the ratio of speeds of the two output shafts during steady state conditions is constant. When the load on one of the output shafts changes, that shaft speed changes even while the ratio of torques on the output shafts remains unchanged. Structure is provided for detecting the resulting change in output shaft speed ratio and for changing the load on the other output drive shaft. Thus, feedback is provided which operates during transition periods when the speed ratio deviates from the fixed value to return the speed ratio to the fixed value and during these periods of transition and steady state the ratio of torques delivered to the two output drive shafts remains constant.

---

This invention relates to dual drive mechanisms employing differential gears and more particularly to a dual drive mechanism for driving first and second outputs at a fixed steady state speed ratio and a fixed torque ratio during both transition and steady state conditions.

Hereofore, certain propeller drive mechanisms for driving contra-rotating concentrically mounted propellers have included a differential drive mechanism coupling a prime mover to the concentric propeller shafts and means for varying the pitch angle of one or both of the propellers so that the loads on the propellers are controlled to maintain the propeller speeds constant and in doing so, the prime mover speed which is the algebraic sum of the two propeller speeds is maintained constant. Thus, the sensing mechanism employed has been responsive to the combined speeds of the two concentric propeller drive shafts (the sum of absolute speeds of the two propeller shafts) and any time this sum deviates from a predetermined value, a control mechanism is actuated which changes the pitch of one of the propellers so that the speed of that propeller changes as necessary to bring the combined speeds to the predetermined value.

The prior drive mechanisms such as the type described above are limited intrinsically in that the ratio of torques delivered to the two concentric contra-rotating shafts is not and cannot be minus one, or the ratio of torques may not be constant during transitions between steady state conditions of operation. Thus, the counter-torque produced by the propeller drive mechanism on the craft carrying the mechanism is not zero and/or is not steady during the transition period.

It is one object of the present invention to provide a mechanism for driving concentric contra-rotating propeller shafts in which at least some of the disadvantages enumerated above with regard to prior propellor drive mechanisms are substantially avoided.

It is another object of the present invention to provide a mechanism for driving two output shafts at a fixed steady state speed ratio and a fixed torque ratio during both transition and steady state operation.

It is another object of the present invention to provide a mechanism for driving two contra-rotating shafts so that the opposing torques on said shafts produce no net torque on the mechanism mount during steady state operation and during transitions in operation between steady state conditions.

It is another object of the present invention to provide a mechanism for driving two concentric contra-rotating propellers so that there will be no net torque on the drive mechanism mount during steady state speed and power operation of the propellers and during transitions of said operation between different steady state conditions.

It is another object of the invention to provide a drive mechanism for concentric contra-rotating propellers so that the shaft to each propeller will carry the same power load and the same torque during steady state operation and both propellers will carry the same torque during transitions between steady state operation.

It is another object of the present invention to provide a drive mechanism for two concentric contra-rotating propellers having equal symmetrical polar moments of inertia so that there will be no net gyroscopic torque on the drive mechanism when the mechanism precesses.

It is a feature of various embodiments of the present invention to employ a differential gear mechanism driving two output drive shafts and means for comparing the speeds of the two shafts therein to produce a signal representing the differential speed and which is indicative of changes in the ratio of speeds of said output drive shafts. This signal is integrated and employed to vary the load on one of the output drive shafts and so the speed ratio of the two output drive shafts is maintained constant by virtue of this feedback control. Various embodiments of the invention described herein are employed to drive concentric contra-rotating propeller blade shafts and demonstrate particular uses of the invention. Other objects and features of the invention will be apparent from the following specific description taken in conjunction with the figures in which:

FIGURE 5 is a block diagram showing the functions involved in the drive mechanism shown in FIGURES 1 and 4;

FIGURE 6 is a block diagram of functions involved in the mechanism shown in FIGURES 2, and 3;

FIGURE 7 is a torque speed diagram to illustrate torque and speed conditions maintained during transitions; and FIGURE 8 is a diagram illustrating the helicopter blade and the significant aerodynamic and mechanical parameters related thereto.

Figure 1:
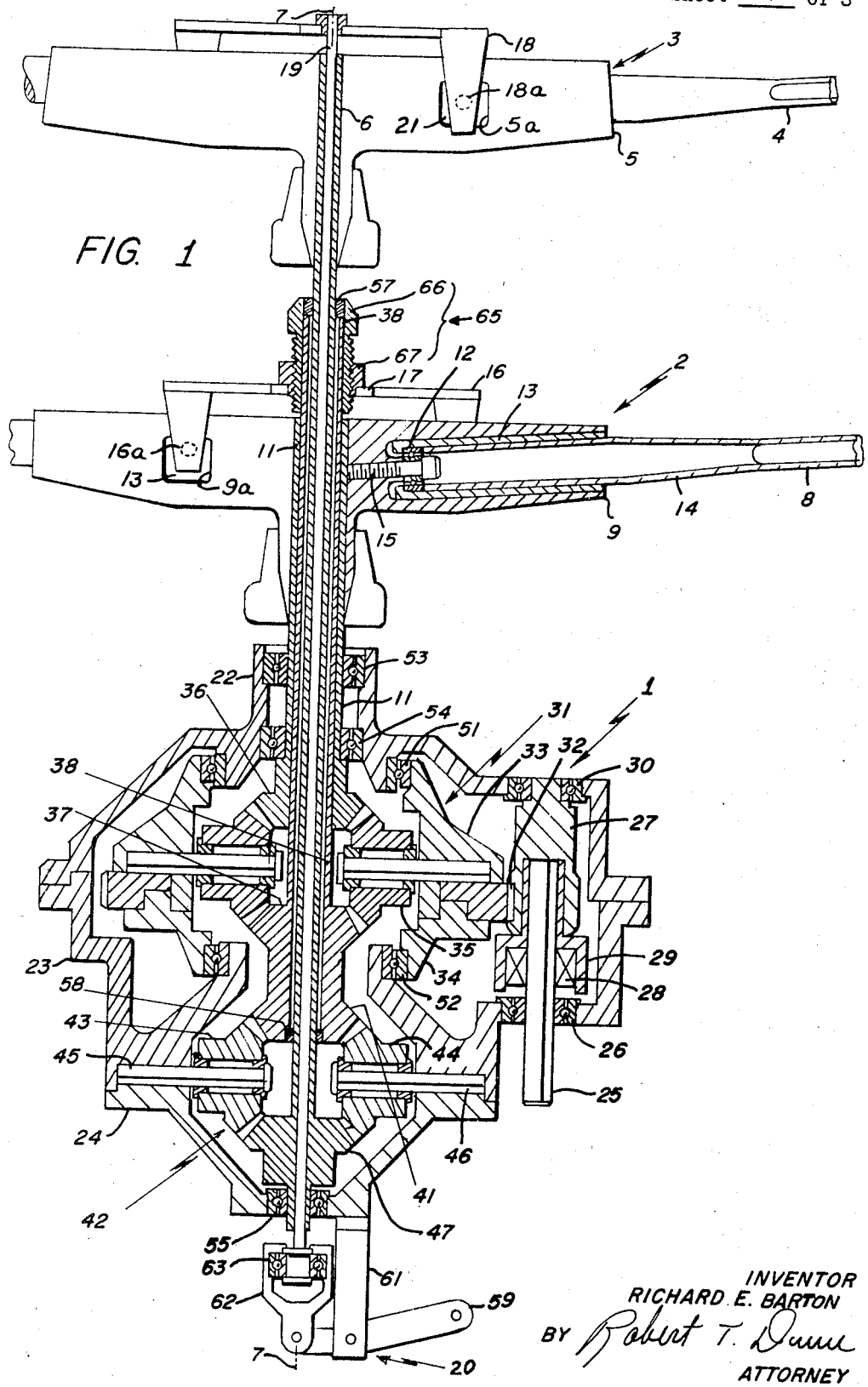
FIGURE 1 is a cut-away view of an embodiment of the invention for driving contra-rotating sets of helicopter blades and for controlling the speeds and torques of the shafts on which the blades are mounted in accordance with principles of the invention.

Turning first to FIGURE 1 there is shown a cross-sectioned view of an embodiment of the invention including a dual drive mechanism 1 incorporating features of the invention for driving inboard 2 and outboard 3 sets of aerodynamic blades such as used to propel a helicopter. The outboard set of blades, such as blade 4, mounts to a hub 5 which is fixed to the hollow outboard drive shaft 6 concentric with the axis 7 of the mechanism so that the outboard blades project radially therefrom defining equal angles between the blades. Similarly, the inboard blades, such as blade 8, are mounted to the inboard hub 9 and project radially from the inboard hub defining equal angles between the inboard blades. The inboard hub 9 is mounted concentrically to the inboard hollow drive shaft 11 which in turn is concentric with the outboard drive shaft 6 and the axis 7 of the mechanism.

Each of the outboard and inboard blades, such as blades 4 and 8, are pivotally mounted to their respective hubs so that they can pivot about an axis which runs the length of the blade. The pivot angle is defined herein as the blade pitch and denoted $\theta$ as shown in FIGURE 8. The blades are preferably air foil shaped in cross-section so as to produce lift in an efficient manner when the blades are driven in rotation through the air. The inboard hub 9 is shown in cross-section to reveal the structure for pivotally mounting the inboard blades such as blade 8 to this hub. The structure includes, for example, a bearing 12 whose outer race is fixed to a sleeve 13 on the shaft 14 of the blade and the inner race is secured to the hub 9 via axle bolt 15 which screws into the hub 9 and, thus, secures the blade shaft 14 to the hub while at the same time permitting the blade to pivot about the axis of the shaft 14 (parallel to the length of the blade 8).

The pitch angle of the inner blades, such as blade 8, are controlled together and set at the same angle $\theta$ by pitch angle control arms, such as arm 16. All the arms, such as 16, for the inboard blades are fixed to a ring 17 so that they move up and down together to vary the pitch of the inboard blades together. For this purpose, the arms 16 are each linked to their respective blade sleeves 13 by a ball and socket connector such as 16a through a suitable opening such as 9a in the hub 9. Similarly, each of the outboard blades has a pitch control arm, such as arm 18, for controlling the pitch of outboard blades 4. The outboard control arms, such as arm 18, attach to the outboard pitch control shaft 19 so that they move up and down together with the shaft 19 varying the pitch of the outboard blades together. The arms 18 are each linked to their respective blade sleeves 21 by a ball and socket conector such as 18a through a suitable opening such as 5a in the hub 5.

The shaft 19 is concentric with the axis 7 of the mechanism and fits slideably within the hollow outboard blade drive shaft 6. This shaft 19 preferably attaches fixedly to the control arms 18 and so in operation, it must rotate with the outboard blades. In order to accommodate this rotation, the other end of the shaft 19 is pivotally attached to the outboard pitch control lever mechanism 20 at the other end of the dual drive mechanism 1.

The dual drive mechanism 1 is shown in FIGURE 1 in cross section except for the solid shafts therein. Many of the parts in this mechanism are figures of revolution about the axes that they rotate and the parts which are not figures of revolution are shown sectioned through an axis of symmetry. The mechanism consists of the upper, middle and lower housing castings denoted 22, 23 and 24 which form the housing assembly. The lower casting 24, as shown may be a figure of revolution while the middle and upper castings 23 and 22 are not figures of revolution, but are sectioned through planes of symmetry. These casting are preferably secured together and sealed against leakage of lubricants contained therein and the assembly is mounted to a craft such as a helicopter. The prime mover in the helicopter may be an internal combustion engine or turbine engine providing drive power to the mechanism 1 by way of the drive shaft 25. The input drive shaft 25 is rotatably secured to the housing assembly via bearing 26 and drives the pinion gear 27 via a free wheeling clutch consisting of an inner member 28 attached to the drive shaft 25 and an outer member 29 attached to the pinion gear 27.

The pinion gear 27 mounts to the housing assembly on bearing 30 and engages the differential gear mechanism 31 by intermesh with outside gear 32 of the differential gear mechanism.

The differential gear mechanism 31 consists of upper and lower differential carriers 33 and 34 to which the outer gear 32 is fixed and which rotatably support a number of planet gears such as planet gear 35. The planet gears in turn mesh with the upper and lower differential output gears 36 and 37. The upper differentital gear 36 is fixedly attached to the inboard propeller drive shaft 11 and so as this gear is rotated, so the inboard blades, such as blade 8, are rotated about the axis 7.

The lower differential output gear 37 fixedly attaches to the hollow inboard blade pitch control shaft 38 which is concentric with the axis 7 and fits rotatably within the inboard drive shaft 11. During steady state operation, the inboard drive shaft 11 and the inboard pitch control shaft 38 rotate together in the same direction at the same speed. However, during transition between steady state operation, the speeds of the inboard and outboard blades may be different, and so it is necessary that the shaft 38 fit rotatably within the drive shaft 11.

The lower differential output gear 37 attaches rigidly to the input gear 41 of gear reversing mechanism 42. The gear reversing mechanism serves to couple rotation of the lower differential output gear 37 to the hollow outboard drive shaft 6 so that during steady state operation, the outboard drive shaft 6 rotates at the same speed as the inboard drive shaft 11, but in an opposite sense so that the inboard and outboard sets of blades 2 and 3 are contra-rotating. The reversing gear mechanism 42 includes the input bevel gear 41 which rigidly attaches to the differential output gear 37 and meshes with two typical reversing bevel gears 43 and 44 which are rotatably mounted on shafts 45 and 46, respectively, which are fixed to the housing assembly. The gears 43 and 44 mesh with the outboard drive shaft gear 47 which is hollow to accommodate passage therethrough of the outboard pitch control shaft 19.

As mentioned above, the upper and lower differential carriers 33 and 34 fasten together with the outside differential drive gear 32 therebetween and form the outside carriage of the differential gear mechanism 31. This carriage carries the planet gears, such as planet gear 35, which directly drive the hollow inboard drive shaft 11 and which drive the outboard drive shaft 6 via the reversing gear mechanism 42. The differential gear carriage is mounted to the housing assembly via bearings 51 and 52 and so the carriage is driven in rotation about the axis 7 by the pinion gear 27.

The inboard drive shaft 11 is mounted to the housing assembly via the bearings 53 and 54. The reversing gear mechanism 42, including the outboard drive gear 47 is mounted to the housing assembly via bearing 55 and, as already mentioned, the reversing gears 43 and 44 are also mounted to the housing assembly. Thus, all gears ride on bearings mounted to the housing assembly except the planetary gears such as 35, the lower differential output gear 37 and the bevel gear 41 which attaches directly thereto. These latter two gears 37 and 41 are carried by the inboard pitch control shaft 38 which, in turn, mounts concentrically to the outboard drive shaft 6 via the bearings 57 and 58. Thus, it is seen, that the bearings 57 and 58 mount the inboard pitch control shaft 38 to the outboard drive shaft 6 which in turn is mounted to the housing via bearing 55 and also, the shaft 38 fits slideably within the inboard drive shaft 11 which in turn mounts to the housing via bearings 53 and 54. Thus, concentricity is maintained between the axis 7 of the mechanism and the outboard drive shaft 6, the inboard pitch control shaft 38 and the inboard drive shaft 11 and all are free to rotate with respect to each other in different directions or at different speeds.

In operation, shaft power is fed to the mechanism via the drive shaft 25 and during steady state operation, the inboard and outboard drive shafts 11 and 6 drive their associated blades in opposite directions at the same speed and the same power. The torques delivered by the differential gear mechanism 31 to the output gears 36 and 37 thereof are equal as this is the characteristic of such a differential gear mechanism. If losses in the reversing mechanism 42 are insignificant, then the torque delivered to the outboard drive shaft 6 will be the same as the torque delivered to the inboard drive shaft 11 and so when blade speeds are equal, blade powers will be equal. A control action is administered to the control mechanism 20 consisting of a lever 59 pivotally attached to the housing via bracket 61 for moving the pitch control yoke 62 along the axis 7 so that the outboard pitch control rod 19, which is rotatably connective thereto via the bearing 63, moves translationally along the axis 7. When this occurs, the outboard pitch control arms, such as arm 18, move parallel to the axis 7 and alter the pitch of the outboard blade such as blade 4. When this occurs, the angle of attack $\alpha$ of the outboard blades changes (see FIGURE 8) and so the lift L and drag D forces exerted by the air on the driven blades will change to produce more or less lift causing the craft to which the mechanism is mounted to ascend or decend in flight.

When, for example, lift increases, drag also increases and when the resultant of these vectors, denoted R, has a component opposite the direction of motion of the blade through the air, then power must be delivered to the blades to maintain their velocity. When this component of R increases and the input shaft power remains the same, then the outboard blades will slow down even though the shaft torque is the same as the inboard blades. This condition is illustrated in the power curves shown in FIGURE 7 which are plots of torque $\tau$ versus blade shaft angular rate $\omega$.

The power curve $Pa$ is initially the same for both sets of blades during steady state operation and, assuming negligible loss in the reversing gear mechanism 42, both sets of blades will operate at the point A on this power curve $Pa$. When the angle of attack of the outboard blades is increased, then the outboard blades will slow down as described, and so the outboard blades will move to a new power curve $Pb$ at constant torque to a point B on that curve and so a transition from steady state is initiated with the inboard blades rotating at the rate $\omega_i$, and the outboard blades rotating at the slower rate $\omega_o$. Simultaneously therewith, the inboard pitch control mechanism 65 will come into operation and increase the angle of attack of the inboard blades so that operation of the inboard blades move from point A on curve $Pa$ at constant torque to point B on curve $Pb$ and once again the inboard and outboard blades will operate at the same point on the same power curve at a new steady state condition.

The control mechanism 65 as shown in FIGURE 1 consists of two members 66 and 67 which threadably connect to each other. Member 66 is attached to the shaft 38 and so it rotates about the axis 7 at the speed of outboard drive shaft 6. The other member 67 is attached to the pitch control arms such as arm 16 which controls the pitch of inboard blade 8. Thus, the member 67 rotates at the speed of the inboard drive shaft 11. It should be noted that the shaft 38 rotates at the same speed as the outboard drive shaft 6, but does not rotate in the same direction; it rotates in the same direction as inboard drive shaft 11. Thus, when the speeds of the inboard and outboard shafts differ, the members 66 and 67 of the control mechanism 65 will not rotate together at the same speed and so the member 67 will move translationally along the axis 7 with respect to member 66. The rate of this translational motion is directly proportional to the difference in speeds between the inboard and outboard shafts and the translational position of member 67 relative to member 66 is directly proportional to the integral of this difference.

The direction of the screw thread connecting members 66 and 67 is such that the angle of attack of the inboard blades is changed so that the inboard drive shaft 11 is loaded to bring the speed of the inboard shaft into coincidence with the speed of the outboard shaft 6. Thus, the speed of the inboard blades is slaved to the speed of the outboard blades. Furthermore, since the torques are at all times during steady state and transitions between steady states the same on each of the drive shafts 6 and 11, the mechanism 1 which mounts these shafts will exert no net torque on the craft to which the mechanism is connected.

FIGURE 5 is a functional block diagram illustrating the various functions and relations between the functions accomplished in the structure shown in FIGURE 1. The functions include those of the engine 71, reduction gear 72 and clutch 73 which follow one after the other in that order. The output of the clutch function is the input to the differential gear function 74 which produces the equal torque outputs 75 and 76, respectively. The reversing gears drive the outboard blade function 79 at the speed $\omega_o$ and the differential gear function drives the inboard propeller at the speed $\omega_i$. These speeds $\omega_o$ and $\omega_i$ are compared as function 80 producing the differential speed which is integrated at 81 to yield the control action $\theta_i$ which is the pitch of the inboard blades.

In operation, an input control action consisting of a change in $\theta_o$ which is the pitch of the outboard blades, changes the load on the outboard blades altering $\omega_o$ which immediately alter the differential between $\omega_o$ and $\omega_i$ and this differential is integrated to produce the change in $\theta_i$. The direct comparison of $\omega_o$ and $\omega_i$ to produce the differential which results in a change in $\theta_i$ provides a relatively high speed response to the control action and there is relatively little delay of the inboard blades in following the outboard blades. As will be seen, with reference to the embodiments shown in FIGURES 2 and 3 and described functionally in FIGURE 6, the inboard blade speed may also be compared with the input drive speed to initiate the control action of the inboard blade pitch.

Figure 2:
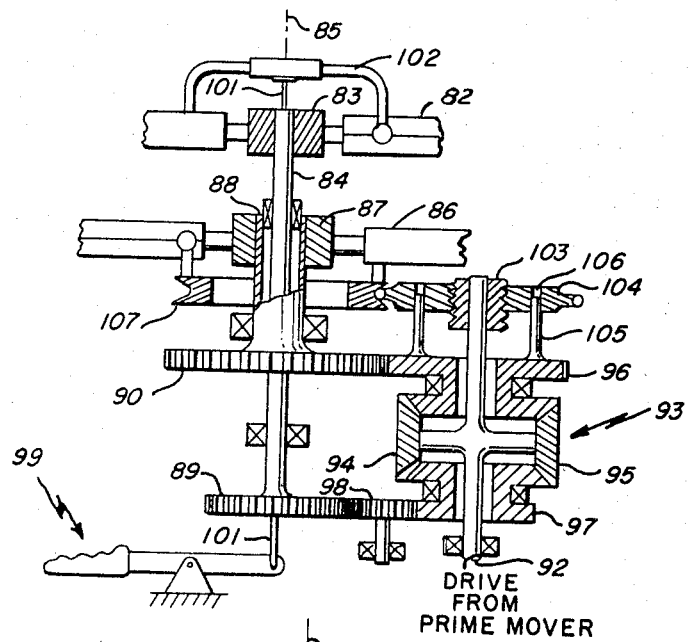
FIGURE 2 illustrates gears and controls for driving concentric contra-rotating helicopter blades and in which the speed of one output shaft is compared with prime mover speed.
Figure 3:
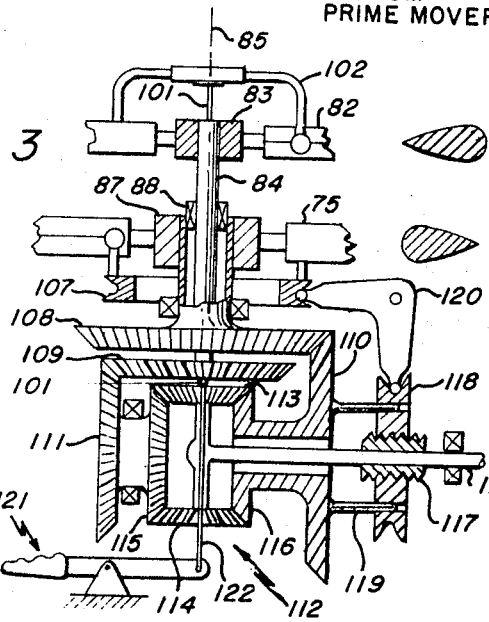
FIGURE 3 illustrates gears and controls similar to FIGURE 2 for driving contra-rotating helicopter blades and in which the gearing losses associated with each drive shaft are substantially equally balanced.

FIGURES 2 and 3 are schematic drawings which illustrate other gearing arrangements and mechanisms for driving concentrically mounted drive shafts of contra-rotating helicopter blades. In both of the arrangements shown in these figures, an initial control action is administered by altering the pitch angle of the outboard blades to decrease or increase the load thereon and so for an instant the load on the prime mover is decreased or increased accordingly. As a result, the input drive shaft from the prime mover will increase or decrease in speed. In these embodiments, the speed of the input drive shaft from the prime mover is compared with the speed of the inboard blade drive shaft to yield a speed differential indicative of the speed differential between the inboard and outboard drive shafts. This speed differential which is detected is represented by a mechanical velocity which is integrated to produce a mechanical position which in turn directly controls the pitch angle of the inboard blades, and so the inboard drive shaft is slaved to the outboard drive shaft just as already described above with reference to FIGURE 1, but the control operates by comparing input drive shaft with the inboard speed rather than comparing inboard and outboard speeds.

For some applications, it is preferred to derive the control action for the slaved blades from a comparison of the speed of the slaved blades with the input drive speeds as in FIGURE 2. This permits an arrangement of drive gears in which there is a very close balance in gear losses from the input drive shaft to the inboard drive shaft and from the input drive shaft to the outboard drive shaft, so that the torques delivered to the inboard and outboard drive shafts are more closely equal. This is a desirable result, because the more closely equal the torques are, the less net counter torque will be imposed upon the craft carrying the mechanism and this is generally desirable.

In FIGURE 2, the outboard blades such as 82 are mounted to the outboard hub 83 attached to the outboard drive shaft 84 concentric with the axis 85 of the device. Similarly, the inboard blades such as 86 mount to the inboard hub 87 fixed to the hollow inboard drive shaft 88 concentric with the axis 85. The outboard shaft 84 connects to outboard drive gear 89 and the inboard drive shaft connects to inboard drive gear 90.

In FIGURE 2, the input drive shaft 92 drives the differential gear mechanism 93 by rotating the planetary gears 94 and 95 about the axis of the input drive shaft. These planetary drive gears mesh with the upper and lower differential output gears 96 and 97 which drive the inboard and outboard gears 90 and 89, respectively, the drive from differential output gear 97 to the outboard drive gear 89 being via reversing idling gear 98. The ratio of the differential output drives to the inboard and outboard drive shafts are equal, but in opposite directions. Thus, during steady state operation when the inboard and outboard drive shafts 84 and 88 carry the same power load, they rotate at the same speed.

For example, while at steady state operation, an input control action is administered via the lever mechanism 99 which moves the outboard pitch control rod 101 in translation along the axis 85 within the hollow outboard drive shaft 84 to change the pitch of the outboard blades via the coupling 102. Immediately, the power balance between the inboard and outboard drive shafts changes and is manifest in a speed unbalance, because the torques remain equal. Thus, the rotational speed of the screw member 103 at the end of the drive shaft 92 will no longer be matched by the speed of the inboard differential output gear 96. Riding on the screw member 103 and threadably connected thereto is a nut member 104 which rotates with the output gear 96, but is free to move with respect thereto along the axis of the drive shaft 92. This action is provided by the pins 105 fixed to the body of gear 96 which slideably connect with slots 106 in member 103. Thus, member 104 will ride up and down on member 103 at a speed directly proportional to the difference in speeds between the input drive shaft 92 and the inboard differential output gear 96 and this difference represents the difference between the speeds of the inboard and outboard shafts 84 and 88. The position of the member 104 on member 103 is directly proportional to the integral of the speed difference. Member 104 engages and positions the inboard pitch control ring 107 which connects to the inboard blades 86 to control the pitch angle of these blades as necessary to alter the power load on the inboard drive shaft to bring the speeds of the inboard and outboard drive shafts into coincidence.

In FIGURE 3, the hollow inboard and outboard shafts 88 and 84 connect to inboard and outboard drive bevel gears 108 and 109, respectively. These gears 108 and 109 mesh with the output bevel gears 110 and 111, respectively, of the differential gear mechanism 112. This differential gear mechanism consists of two planetary gears 113 and 114, mounted to the input drive shaft 115 from the prime mover, which mesh with the differential primary output gears 115 and 116. These primary output gears are fixed to the bevel gears 111 and 110, respectively, and rotate rigidly therewith.

A screw member 117 attached to the drive shaft 115 threadably engages a nut member 118 which rotates with bevel gear 110 by virtue of the pins 119 attached to the gear 110 which slideably engage the nut 118 permitting it to move in translation parallel to the drive shaft 115 relative to the screw 117 and the pins. The rate of this relative motion is directly proportional to the speed differential between the input drive shaft 115 and the bevel drive gear 110 which drives the inboard drive shaft 88 at a one to one ratio. The nut 118 engages a right angle lever 120 at one end thereof. The other end of the lever engages the inboard blade pitch control ring 107 moving it up and down as the nut 118 moves left and right, respectively.

In operation, an input control action administered by lever mechanism 121 moves the connecting rod 122 up or down, which in turn moves the outboard pitch control rod 101 up or down and so the pitch and, therefore, the angle of attack of the outboard blades 82 is changed. This results in a change in the power load on the outboard drive shaft 84 and so the shaft speed increases or decreases. This causes a corresponding increase in the shaft speed of the inboard drive shaft 88 while at the same instant the speed of the input drive shaft 115 remains yet unchanged. As a result, the screw 117 and nut 118 rotate at different speeds and so the nut 118 rides along the screw actuating the lever 120 which moves the inboard pitch control ring 107 up or down as necessary to change the angle of attack of the inboard blades to make the load on the inboard drive shaft equal to the load on the outboard drive shaft. In this manner speed synchronism is achieved.

FIGURE 6 is a functional block diagram illustrating operation of either of the systems shown in FIGURES 2 or 3. These functions include the input drive shaft function 123 which drives the differential gear function 124 and the compare function 125 by which the speeds of the input drive shaft 123 and the inboard blades 126 are compared producing a difference speed 127 which is integrated in function 128 and fed back as a control action $\theta_i$ to the inboard blades 126. The differential gear function 124 also couples to the reversing gear function 129 which in turn drives the outboard blades 130. An input actuation is initiated by changing $\theta_o$, the pitch angle of the outboard blades. This changes the load on the outboard shaft causing its speed to change and this speed change is reflected through the reversing gears 129, differential gears 124 to the compare function 125 altering the output thereof which is integrated and controls inboard blades 126. Thus, the inboard shaft is slaved to the outboard and control action is initiated by varying the pitch $\theta_o$ of the outboard blades.

Figure 4:
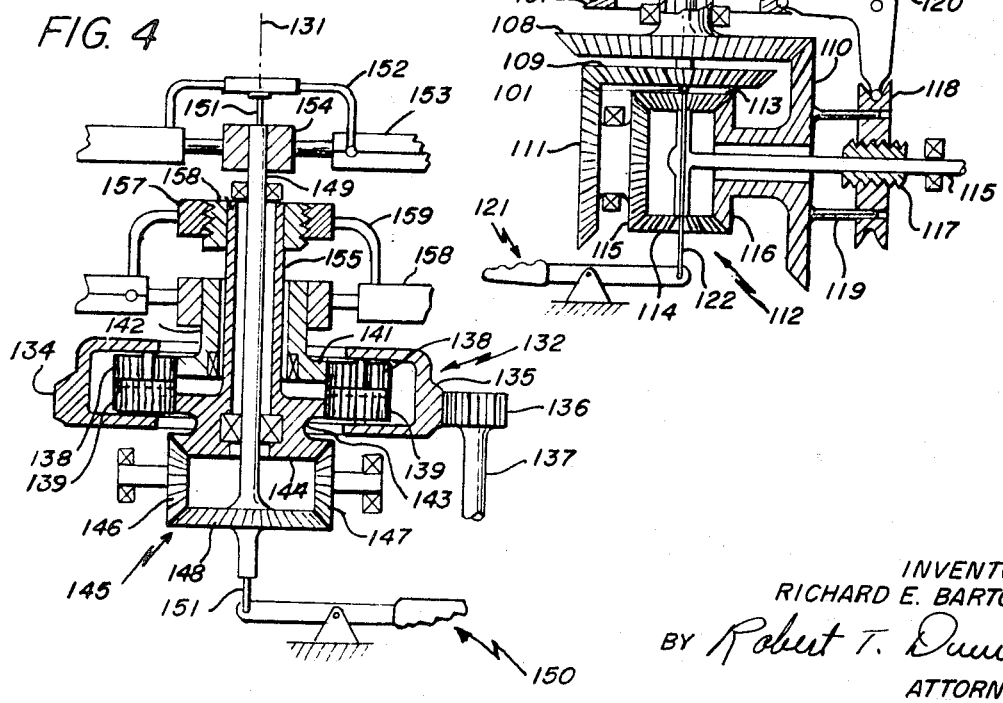
FIGURE 4 illustrates an embodiment for driving concentric contra-rotating helicopter blades employing a planetary type differential gear mechanism.

FIGURE 4 illustrates another arrangement of gears and control structure including a planetary-sun gear type differential drive mechanism and in which pitch control is derived by comparing inboard and outboard shaft speeds as in FIGURE 1. This has the advantage of forming a rather compact arrangement of gears and pitch controls which is symmetrical about the axis 131 of the system. The differential 132 includes a planet gear carrier 135 having an external gear 134 on its periphery. The external gear 134 meshes with gear 135 driven by the input drive shaft 137. The carrier 135 carries two meshing sets of planetary gears 138 and 139. The planetary sets 138 and 139 mesh with sun gears 141 and 143, respectively. Gear 143 is rigidly connected to the input gear 144 of reversing gear system 145. The reversing gear system 145 consists of input bevel gear 144 meshing with bevel gears 146 and 147 which in turn mesh with bevel gear 148 which connects to the outboard blade drive shaft 149. Gear 141 is fixed to the inboard drive shaft 142.

The ratios of gears in the differential 132 and reversing gears 145 are such that equal torque is delivered to the inboard and outboard drive shafts 142 and 149 and when the planetary gears 138 and 139 are not rotating on their axles, the shafts 142 and 149 are driven at the same speed, but in opposite direction.

An input control action is initiated by lever mechanism 150 which actuates the outboard blade pitch control rod 151 moving it translationally along the axis 131 within the hollow outboard drive shaft 149 and by virtue of coupling 152, the outboard blades 153 are rotated on their hub 154 to vary the pitch of these blades. This also changes the angle of attack of the outboard blade and alters the load on the outboard shaft 149. Since the outboard shaft and the sun gear 143 rotate together at the same speed, but in opposite directions, the speed change in shaft 149 will be accompanied by an equal speed change in the hollow inboard pitch control shaft 155 attached to the sun gear 143.

A screw member 156 attached to the hollow control shaft 155 engages a nut member 157 riding thereon and which rotates with the inboard blades 158 by virtue of the coupling 159 thereto. Thus, when there is a speed differential between the inboard and outboard blades, the nut 157 will ride along screw 156 at a speed directly proportional to the speed differential and so the position of the nut on the screw is directly proportional to the integral of this speed differential and directly controls the pitch angle of the inboard blades 158 by virtue of the coupling 159 thereto. By this means, the power and speed of the inboard blades are slaved to the power and speed of the outboard blades and at all times during steady state and transition phases of operation the inboard and outboard shaft torques are equal and opposite.

This completes description of a number of embodiments of the present invention of a drive mechanism powered by an input drive shaft for producing dual drives of equal torque and including means for detecting speed changes of at least one of the dual drives which result from changes in the load thereon and adjusting a load on the other dual drive so that the speed ratio and power ratio of the dual drives are maintained constant. The various embodiments described show application of the invention to drive concentric contra-rotating helicopter blades. These are described by way of example of some unique applications of the invention and are not intended to limit the spirit and scope of the invention.

What is claimed is:

1. A mechanism for driving first and second output shafts at a fixed steady state speed ratio and a fixed torque ratio during both transition and steady state comprising,
    a power drive shaft,
    a differential gear mechanism having an input drive shaft and two output drive shafts,
    means for coupling said two differential output drive shafts to said first and second output drive shafts, respectively,
    said coupling means including means for reversing the direction of rotation of one of said differential output drive shafts, whereby said first and second output drive shafts rotate in opposite direction,
    means for coupling said power drive shaft to said differential input drive shaft,
    means for varying the load on said first output drive shaft,
    means for comparing the speeds of any two of said first, said second and said power drive shafts producing a signal proportional to the speed difference therebetween,
    means for integrating said difference signal,
    means responsive to said integrated difference signal for producing a shaft load which is a function thereof, and
    means for applying said produced shaft load to said second output drive shaft.

2. A mechanism as in claim 1 and in which, said shafts whose speeds are compared are said first and said second output drive shafts.

3. A mechanism as in claim 1 and in which, said shafts whose speds are compared are said second drive shaft and said power drive shaft.

4. A mechanism as in claim 1 and in which, said difference signal is a mechanical velocity, and said integrated difference signal is a mechanical position.

5. A mechanism as in claim 1 and in which, said first and second output drive shafts are concentric.

6. A mechanism as in claim 5 and in which, said first and second output shaft torque ratio is minus one, whereby said first and second output shafts exert negligible counter torque on the mount of said mechanism.

7. A mechanism as in claim 6 and in which, said steady state speed ratio is minus one, whereby the powers of said first and second output shafts during steady state are equal.

8. A mechanism as in claim 1 and further including, first and second sets of blades in a fluid medium driven by said first and second output drive shafts, respectively. whereby the angle of attack of said blades is determinative of the load on the associated output drive shaft and
    means responsive to said integrated difference signal for varying the angle of attack of said blades of said second set,
    whereby the load on said second output shaft is varied.

9. A mechanism as in claim 4 and further including, first and second sets of blades in a fluid medium driven by said first and second output drive shafts, respectively, whereby the angle of attack of said blades is determinative of the load on the associated output shaft, and
    means responsive to said mechanical position for varying the angle of attack of said blades of said second set,
    whereby the load on said second output shaft is varied.

10. A mechanism as in claim 7 and further including, first and second sets of blades in a fluid medium driven by said first and second output drive shafts, respectively, whereby the angle of attack of said blades is determinative of the load on the associated output shaft, and
    means responsive to said integrated difference signal for varying the angle of attack of said blades of said second set,
    whereby the load on said second output shaft is varied.

11. A mechanism as in claim 9 and in which,
    said mechanical position which is the integrated difference signal is the translational position of a first body which threadably connects with a second body so that one is free to rotate with respect to the other, and
    means are provided for rotating said first and second bodies at speeds proportional to the speeds of said first and second output drive shafts, respectively,
    whereby the translational position of one of said bodies relative to the other is said mechanical position, and
    means are coupled to one of said bodies for varying the angle of attack of said second set of blades.

References Cited

UNITED STATES PATENTS

| 2,216,013 | 9/1940 | Kenney | 170—135.27 |
| 2,380,889 | 7/1945 | Waseige | 170—135.27 |
| 2,403,243 | 7/1946 | Seppeler | 170—135.29 |
| 2,687,181 | 8/1954 | Tiedeman | 170—135.27 |
| 2,948,343 | 8/1960 | Conn et al. | 170—132.27 X |

FOREIGN PATENTS 531,756   1/1941   Great Britain.

EVERETTE A. POWELL, Jr., Primary Examiner.

U.S. Cl. X.R.

74—675; 170—135.28